United States Patent [19]
Hendrickson

[11] 3,949,904
[45] Apr. 13, 1976

[54] EPOXY GUN

[76] Inventor: Carl E. Hendrickson, P.O. Box 81, Sheridan, Wyo. 82801

[22] Filed: June 7, 1974

[21] Appl. No.: 477,350

[52] U.S. Cl. .............. 222/135; 222/145; 239/432; 259/7
[51] Int. Cl.² .............................................. B01F 7/08
[58] Field of Search ........... 222/135, 137, 145, 235, 222/240; 259/6, 7, 8, 9, 10; 239/432

[56] References Cited
UNITED STATES PATENTS

| | | | |
|---|---|---|---|
| 2,788,337 | 4/1957 | Preiswerk et al. | 239/142 X |
| 3,009,606 | 11/1961 | Zimmerman | 222/135 UX |
| 3,741,441 | 6/1973 | Eberle | 222/135 |

*Primary Examiner*—Drayton E. Hoffman
*Assistant Examiner*—Frederick R. Handren
*Attorney, Agent, or Firm*—Hill, Gross, Simpson, Van Santen, Steadman, Chiara & Simpson

[57] ABSTRACT

A portable epoxy gun capable of mixing two different materials to form an epoxy resin mixture and for dispensing the mixture under pressure through a nozzle characterized by a T-shape housing having an inlet and outlet ports axially aligned and an intermediate opening or port extending perpendicular thereto, conduits separately conveying the materials to the inlet port, and a mixing element attached on a rotatable shaft extending across the housing to mix the materials to form the epoxy resin mixture. Preferably, the mixing element is rotated in a clockwise direction and has left-handed threads or grooves to urge the mixed material away from the opening of the housing and to urge the mixing element tightly against a sealing washer to prevent flow of the epoxy material along the shaft.

8 Claims, 4 Drawing Figures

U.S. Patent  April 13, 1976  3,949,904
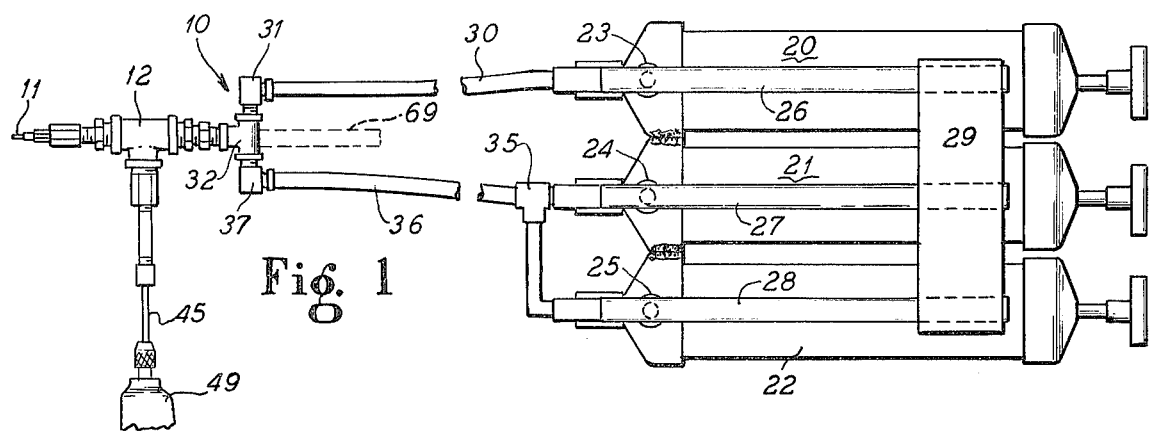
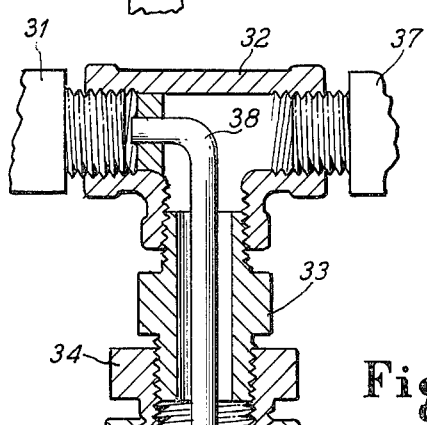
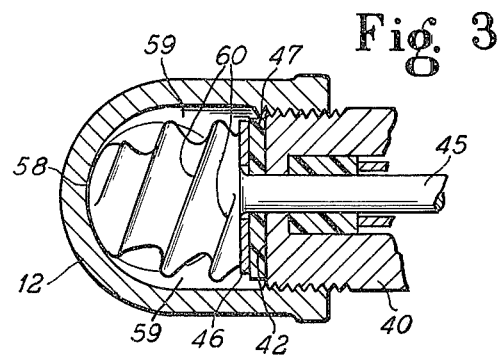
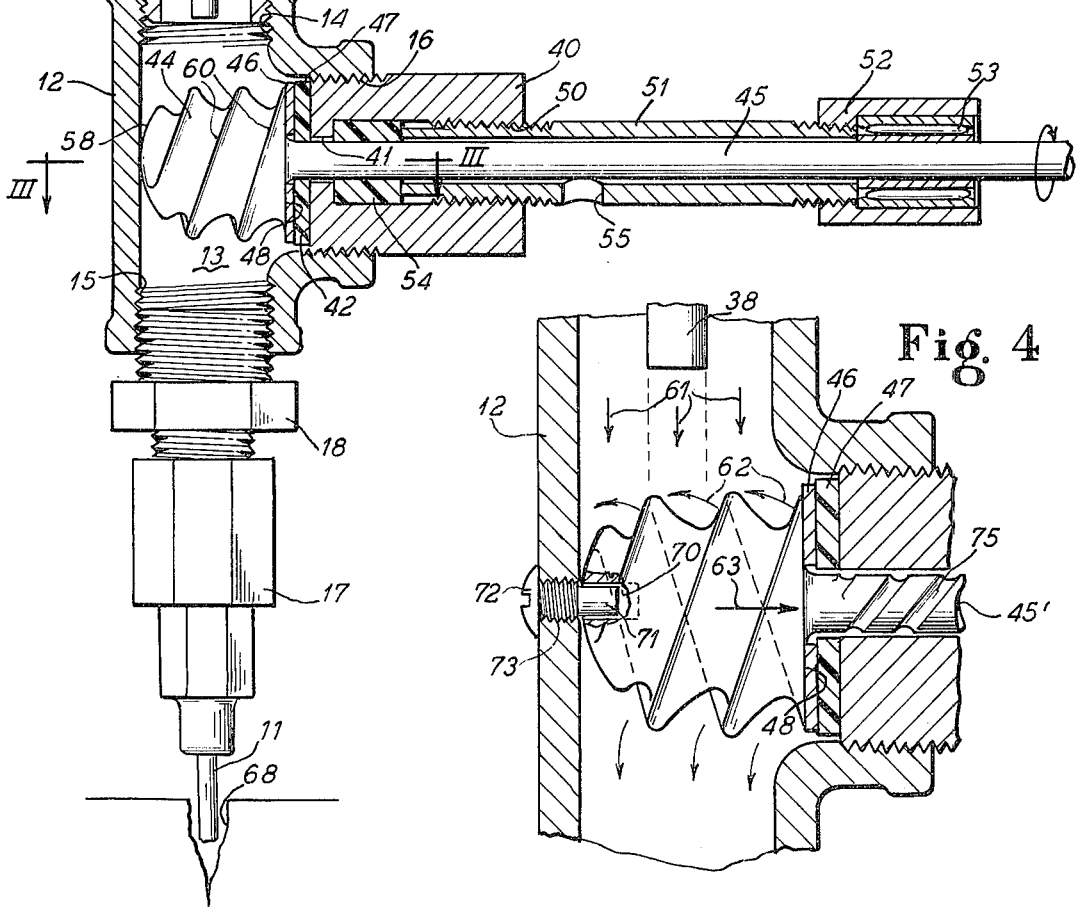

EPOXY GUN

BACKGROUND OF THE DISCLOSURE

1. Field of the Invention

The present invention is directed to a portable device for mixing materials and for dispensing the mixed materials under pressure through a nozzle.

2. The Prior Art

In many instances, it is desirable to dispense a mixture of two materials which are preferably stored separately. An example of known devices are multiple spray heads which are connected to separate supplies of materials and direct the sprays to mix the materials as they are being projected onto a surface. An example of this type of device is disclosed in U.S. Pat. No. 3,033,472. It has also been proposed to provide various devices which mix two separate materials prior to being discharged through a single nozzle. An example of this type of a device is disclosed in U.S. Pat. No. 3,478,963.

In the dispensing of a mixture of two or more materials, it is often desirable to ensure that the material is well mixed by using a homogeneous device which is disclosed in U.S. Pat. No. 2,817,500 or by rotating a stirring element in the path of the flow. Different examples of rotating stirring elements are disclosed in U.S. Pat. Nos. 2,798,698, 3,181,838 and 3,181,839.

With the introduction of epoxy adhesives in which two materials are mixed to cause a chemical reaction to develop the adhesive material, various problems of dispensing the two materials in the proper proportion have existed. One solution is a double barrel dispensing device containing two cylinders of the two materials which deposit the two materials together on a surface as it is being dispensed. An example of this type of device is disclosed in U.S. Pat. No. 3,311,265. While the device of the last-mentioned patent will ensure the proper proportions, it may not provide a thorough mixing of the two materials. It has been suggested to utilize a mixing chamber having a rotating mixing element which mixes the two materials prior to their discharge through a nozzle. An example of this device is disclosed in U.S. Pat. No. 2,788,337.

When using an epoxy resin either alone or with a filler material to either repair cracks or fill holes, the material that is being dispensed must be dispensed under a large pressure so that it will extrude or flow along the surfaces of the cracks or into the hole as it is discharged from the nozzle. Therefore, not only must the two materials which combine to form the epoxy resin be correctly mixed in the correct proportion, high pressures are required to obtain the flow from the nozzle with sufficient force to force the mixture into all of the cracks and crevices being filled. This high pressure in the mixing chamber causes problems with extruding or flowing of the material around the movable parts such as the rotating shaft. This undesirable flow of the mixture will set up or harden and prevent the proper operation of the device.

SUMMARY OF THE INVENTION

The present invention is directed to a portable dispensing device such as an epoxy gun which mixes two constituents or materials in the desired portion and dispenses the mixed materials under pressure through a nozzle. The construction of the device utilizes an increased pressure of the material to increase the sealing around moving parts in a mixing chamber to prevent flow of the material into undesired portions of the device. To accomplish these tasks, the device utilizes a housing having a mixing chamber in communication with an inlet port, an outlet port and an opening intermediate the ports; a nozzle attached to the outlet port; a separate container of each of the two materials interconnected by separate passages to the inlet port; means for creating a pressure flow of each of the materials through the passage, the mixing chamber and out of the nozzle; a fitting having an axial passage disposed in the opening with a flat end surface facing the mixing chamber; a mixing element attached to an end of the shaft, with the shaft being supported for rotation in the passage of the fitting with the mixing element extending into the mixing chamber; means for rotating a shaft and a seal means surrounding the shaft between the flat end surface and the mixing element for preventing flow of the material along the shaft. The mixing element has groove means or a propeller for mixing the material during rotation of the shaft and for coacting with the material to create a force to urge the mixing element against the seal means so that as the pressure of the material in the chamber increases, the force increases to urge the element tighter against the seal means. Preferably, the housing has a T-shape with the inlet and outlet ports being coaxially aligned and the opening extending at right angles thereto so that the mixing element extends across the mixing chamber. The passages which convey or extend from the separate chambers of material to the inlet port preferably have one passage with a conduit which is coaxially aligned in the conduit forming the other passage at the inlet port so that the flow of the two materials is a coaxial flow. In one embodiment, the fitting has enlarged portion around the passage receiving the shaft which receives a bearing formed by packing material which is pressed into tight engagement with the shaft to form a support bearing. In another embodiment, the shaft is provided with threads which convey any material that leaks passed the seal means back towards the seal means to protect the other bearings of the shaft and the housing has a pin received in a passage of the mixing element to form a support bearing.

BRIEF DESCRIPTION OF THE DRAWINGS

FIG. 1 is a plan view of the portable device of the present invention;

FIG. 2 is an enlarged cross-sectional view with portions in elevation of the mixing chamber of the present invention;

FIG. 3 is a partial cross-sectional view taken along lines III—III of FIG. 2; and FIG. 4 is an enlarged view showing a second embodiment for supporting the mixing element in the device.

DESCRIPTION OF THE PREFERRED EMBODIMENTS

The principles of the present invention are particularly useful in a portable device 10, which is illustrated in FIG. 1, for mixing two materials in the desired proportions and dispensing the materials under pressure through a nozzle 11. The device 10 has a housing 12, which as best illustrated in FIG. 2, has a T-shaped configuration with a mixing chamber 13 in communication with an inlet port 14, an outlet port 15 and an opening or port 16 intermediate the ports 14 and 15. As illustrated each of the ports 14 and 15 along the opening 16 are provided with threads so that the nozzle 11 carried by a fitting 17 can be detachably connected to the output port 15 by a threaded coupling element 18.

The device 10 includes at least two containers for separately storing the two materials that are to be mixed and then dispensed. In the particular embodiment illustrated in FIG. 1, each of the containers is formed by commercially available grease guns 20-22 which grease guns have been welded together to form a single unit. Three containers are utilized since the ratio of the mixture of the two materials is approximately 2 to 1. The guns 20–22 have pumps 23–25 which are actuated by levers 26–28. The levers 26, 27, 28 are interconnected by a structural member 29 so that the three pumps 23, 24, 25 are actuated simultaneously.

The output of the pump 23 is connected by a flexible conduit 30 to a fitting 31 which is threadably received in a T-shaped fitting 32 that is connected by couplings 33, 34 to the inlet port 14. The output of the pumps 24, 25 are connected by appropriate fittings 35 to a flexible conduit 36 which extends to a fitting 37 threaded into one end of the T-shaped fitting 32. As best illustrated in FIG. 2, the fitting 31 is provided with a conduit 38 of a reduced diameter which extends coaxially through the passage of the fittings 33 and 34, so that the output of the pump 23 is discharged along an axis into the mixing chamber 13 with the flow from the discharge of the pumps 24 and 26 being coaxially disposed therewith.

In the arrangement illustrated in FIG. 1, the three grease gun-type containers provide a substantially 2 to 1 mixing ratio between the two different materials. Such a ratio may be dictated by the filler which is provided in one of the two materials being mixed together to form the epoxy resin. Instead of utilizing three guns, different size guns could be utilized to obtain the desired ratio or guns having controlled orifices to control their output could be utilized.

As best illustrated in FIG. 2, the ports 14 and 15 are substantially coaxially aligned and the ports or opening 16 extends substantially at right angles to the axis of the two ports. Threadably received in the opening 16 is a fitting 40 having a passage 41 and a flat end surface 42 facing into the chamber. A mixing element or head 44 is attached or supported on an end of a shaft 45 which is rotatably supported in the passage 41 with the element 44 extending into the mixing chamber 13. Seal means comprising a metal washer 46, which may be a steel washer, and a plastic washer 47, which is preferably a Teflon washer, is interposed between the flat surface 42 and a base 48 of the mixing element 44. To rotate the shaft 45 and thus the mixing element 44, the shaft 45 may be chucked in an electric drill 49 or connected to a flexible drive shaft which is rotated by the drill.

To provide bearing supports for the shaft 45, the fitting 40 has an enlarged portion 50 having threads and a tubular member 51 is threadably received in the enlarged portion and supports a bearing housing 52 containing a needle bearing unit 53 which supports the shaft 45 but allows axial movement. Adjacent to the passage 41 and the element 44, the enlarged portion 50 contains packing material 54, which may be asbestos-Teflon packing material, and is squeezed into tight bearing relationship with the shaft 45 by the end of the tubular member 51 which acts as a packing nut. The tubular member 51 is provided with an aperture 55 so that the operator can visually see if any of the mixed materials are being extruded or flowing past the packing 54 and along the shaft 45.

The element 44 has a substantially cylindrical configuration terminating in an end 58 which has a dome configuration formed by a curve surface. Thus, as illustrated in FIG. 3, the element 44 as it extends across the chamber 13 substantially blocks the chamber except for spaces 59, 59.

To mix the flows of the two materials, the element 44 has groove means such as a pair of helical threads or grooves 60 which extend in a left-hand direction. When the shaft 45 is rotated in a clockwise direction, the threads 60 lift the material in the flows, which are indicated by arrows 61 (FIG. 4), in an upward direction, as indicated by arrows 62, to ensure a thorough mixing of the two materials before they move through the space 59 past the mixing element 44.

As the flow of materials is raised and mixed in the direction 62, a resultant force, which is indicated by the arrow 63, forces the base 48 of the element 44 onto the seal means comprising the steel washer 46 and the plastic or Teflon washer 47 to ensure a snug seal for preventing flow of the material along the shaft such as 45.

The continual rotation of the shaft 45 and the mixing element 44 causes a thorough mixing of the two constituents or materials that are forming the mixture being dispensed through the nozzle 11. One of the purposes of the present device is to allow filling of cracks or crevices 68 by forcing the mixture, such as an epoxy adhesive or filler through the nozzle 11 which is inserted into the cracks 68. This operation requires a high pressure which is obtained by the pumps such as a 23, 24, 25. Thus, as the pressure of the material in the mixing chamber 13 increases the reaction force in the direction of arrow 63 will increase to ensure a tight seal to prevent flow of any of the material along the shaft 45.

Due to the high lateral forces placed on the shaft 45 by the flow of the material under a high pressure through the chamber 13, the packing 54 forming the bearing adjacent the head or element 44 will be subject to deformation and wear. However, due to the threaded connections, the tube 51 can be used to increase the pressure on packing 54 and the packing 54 can be easily replaced when necessary.

Another feature of the device is the use of the various couplings 33 and 34, which enable quick removal of the fitting 32 and the cleaning of the housing 12. For example, a source of water such as a garden hose having a fitting for connection to the inlet port 14 or to either of the coupling 33 or 34 to run water through the housing 12 and nozzle 11 with the mixing element or head 44 being rotated to flush any mixture from the parts.

If desired, a handle 69 which is shown in broken lines in FIG. 1 may be provided. As illustrated, the handle 69 is attached to the fitting 32 by a connection which may be either permanent or detachable.

Another embodiment of the device instead of using the packing such as 54 for a bearing utilizes a second bearing formed by a bore 70 (FIG. 4) extending axially inward from surface 58 of the element 44 which bore 70 receives a projection formed by a pin 71 which may be formed on the end of a threaded member 72 threaded in an aperture 73 in the wall of the housing 12. In this embodiment, only the bearing 53 and the bearing formed by the pin received in the bore are utilized. In addition thereto, left-handed thread 75 are provided on the drive shaft 45' so that any of the mixture of materials that may pass through the seal means formed by the washers 46, 47 is carried along the tube back to the area of the washer.

Although various minor modifications may be suggested by those versed in the art, it should be understood that I wish to employ within the scope of the patent granted hereon all such modifications as reasonably and properly come within the scope of my contribution to the art.

I claim:

1. A portable device for mixing two materials in a desired proportion and dispensing the materials under pressure from a nozzle, comprising a housing having a mixing chamber in communication with an inlet port, an outlet port and an opening intermediate said ports, said housing having a substantial T-shaped configuration with the inlet and outlet ports being coaxially aligned and the opening extending at right angles thereto; a nozzle attached to the outlet port; a separate container for each of the two materials; separate passages connecting each container to the inlet port; means for creating a pressure flow of each of the materials from its container through its passage, the mixing chamber and out of the nozzle; a fitting having an axial passage disposed in the opening with a flat end surface facing the mixing chamber; a mixing element attached to an end of a shaft; said shaft being supported for rotation in the axial passage of the fitting with the mixing element extending into and across the mixing chamber; means for rotating said shaft; and seal means surrounding the shaft between the flat end and the mixing element for preventing flow of the material along said shaft, said mixing element having groove means for mixing the material during rotation of the shaft and for coacting with the material to create a force to urge the element against the seal means so that as the pressure of the material in the chamber increases, the force increases to urge the element tighter against the seal means.

2. A portable device according to claim 1, wherein the seal means includes a metal washer and a plastic washer telescopically received on the shaft.

3. A portable device according to claim 2, wherein one of the separate passages terminates in a conduit telescopically received in a conduit forming the other passage so that at the inlet port the materials are received in a flow with the flow of one material being concentric to the flow of the other material.

4. A portable device for mixing two materials in a desired proportion and dispensing the materials under pressure from a nozzle, comprising a housing having a mixing chamber in communication with an inlet port, an outlet port and an opening intermediate said ports; a nozzle attached to the outlet port; a separate container for each of the two materials; separate passages connecting each container to the inlet port; means for creating a pressure flow of each of the materials from its container through its passage, the mixing chamber and out of the nozzle; a mixing element attached to an end of a shaft; a fitting having an axial passage including at least one bearing disposed in the opening with a flat end surface facing the mixing chamber; said shaft being supported for rotation in the bearing of the axial passage of the fitting with the mixing element extending into the mixing chamber; means for rotating said shaft; seal means surrounding the shaft between the flat end and the mixing element for preventing flow of the material along said shaft, said housing having a projection extending into a passage provided in the mixing element to form a bearing support therewith, the shaft being provided with a helical groove extending in a direction for carrying any of the materials that passes the seal means back towards the seal means, and said mixing element having groove means for mixing the material during rotation of the shaft and for coacting with the material to create a force to urge the element against the seal means so that as the pressure of the material in the chamber increases, the force increases to urge the element tighter against the seal means.

5. A portable device for mixing two materials in a desired proportion and dispensing the materials under pressure from a nozzle, comprising a housing having a mixing chamber in communication with an inlet port, an outlet port and an opening intermediate said ports; a nozzle attached to the outlet port; a separate container for each of the two materials; separate passages connecting each container to the inlet port; means for creating a pressure flow of each of the materials from its container through its passage, the mixing chamber and out of the nozzle; a mixing element attached to an end of a shaft; a fitting having an axial passage including at least one bearing disposed in the opening with a flat end surface facing the mixing chamber; said shaft being supported for rotation in the axial passage of the fitting with the mixing element extending into the mixing chamber; said passage of the fitting having an enlarged portion and said fitting containing a second bearing disposed in said enlarged portion to support said shaft adjacent the mixing element; means for rotating said shaft; and seal means surrounding the shaft between the flat end and the mixing element for preventing flow of the material along said shaft, and mixing element having groove means for mixing the material during rotation of the shaft and for coacting with the material to create a force to urge the element against the seal means so that as the pressure of the material in the chamber increases, the force increases to urge the element tighter against the seal means.

6. A portable device according to claim 5, wherein said second bearing is formed by a packing material and said fitting includes means for applying pressure on said packing material.

7. A portable device according to claim 6, wherein said means for applying pressure comprises a tubular member threaded into the enlarged portion, said tubular member having an end opposite the end threaded in the enlarged portion supporting the first bearing, and said tubular member having an opening enabling observing of the shaft supported therein.

8. A portable device for mixing two materials in a desired proportion and dispensing the materials under pressure from a nozzle, comprising a housing having a mixing chamber in communication with an inlet port, an outlet port and an opening intermediate said ports; a nozzle attached to the outlet port; a separate container for each of the two materials; separate passages connecting each container to the inlet port; means for creating a pressure flow of each of the materials from its container through its passage, the mixing chamber and out of the nozzle; a fitting having an axial passage disposed in the opening with a flat end surface facing the mixing chamber; a mixing element attached to an end of a shaft, said shaft being supported for rotation in the axial passage of the fitting with the mixing element extending into the mixing chamber; means for rotating said shaft; and seal means surrounding the shaft between the flat end and the mixing element for preventing flow of the material along said shaft, said seal means including a metal washer and a plastic washer telescopically received on the shaft; said mixing element having groove means for mixing the material during rotation of the shaft and for coacting with the material to create a force to urge the element against the seal means so that as the pressure of the material in the chamber increases, the force increases to urge the element tighter against the seal means.

* * * * *